(12) United States Patent
Chen

(10) Patent No.: US 11,774,687 B2
(45) Date of Patent: *Oct. 3, 2023

(54) OPTICAL INTERFACE ASSEMBLY AND OPTICAL MODULE

(71) Applicant: InnoLight Technology (Suzhou) LTD., Jiangsu (CN)

(72) Inventor: Long Chen, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,413

(22) Filed: Jul. 1, 2022

(65) Prior Publication Data

US 2022/0334328 A1    Oct. 20, 2022

Related U.S. Application Data

(63) Continuation of application No. 17/035,924, filed on Sep. 29, 2020, now Pat. No. 11,402,592.

(30) Foreign Application Priority Data

Sep. 29, 2019 (CN) .......................... 201910932962.3

(51) Int. Cl.
  *G02B 6/42* (2006.01)
(52) U.S. Cl.
  CPC ........... *G02B 6/4207* (2013.01); *G02B 6/421* (2013.01)
(58) Field of Classification Search
  CPC ................................................. G02B 6/4207
  See application file for complete search history.

(56) References Cited

U.S. PATENT DOCUMENTS

| | | | | |
|---|---|---|---|---|
| 6,567,223 B2 * | 5/2003 | Ludington | ............... | G02B 3/00 359/811 |
| 2002/0168153 A1 * | 11/2002 | Yamabayashi | ....... | G02B 6/4237 385/37 |
| 2004/0052476 A1 | 3/2004 | Houmault | | |
| 2007/0041686 A1 * | 2/2007 | Wada | ..................... | G02B 6/421 385/92 |
| 2009/0087142 A1 * | 4/2009 | Shibayama | ................ | B41J 2/46 385/33 |
| 2019/0103919 A1 | 4/2019 | Hailai et al. | | |
| 2019/0162921 A1 * | 5/2019 | Lee | ...................... | G02B 6/4214 |

FOREIGN PATENT DOCUMENTS

| | | |
|---|---|---|
| CN | 202916459 U | 5/2013 |
| CN | 108139555 A | 6/2018 |
| CN | 109239853 A | 1/2019 |

* cited by examiner

*Primary Examiner* — Sung H Pak
*Assistant Examiner* — Hoang Q Tran
(74) *Attorney, Agent, or Firm* — Finnegan, Henderson, Farabow, Garrett & Dunner, LLP

(57) ABSTRACT

An optical interface assembly, comprising a lens, an optical receptacle, a stub disposed in the optical receptacle. The lens includes a convex surface farther away from the stub and a flat surface near the stub, the flat surface and a cross section of the lens being disposed at an inclined angle from each other. A first end surface of the stub facing the lens is disposed at an inclined angle relative to an axis of the stub. When a light beam is coupled into the stub by the lens, a portion of a return light reflected from the first end surface of the stub is reflected to an outside of the lens.

9 Claims, 3 Drawing Sheets

OPTICAL INTERFACE ASSEMBLY AND OPTICAL MODULE

CROSS-REFERENCE TO RELATED APPLICATION

This application is a continuation of application Ser. No. 17/035,924, filed Sep. 29, 2020 (allowed), which is based upon and claims priority to Chinese Patent Application 201910932962.3, filed on Sep. 29, 2019. The entire contents of all of the above-identified applications are incorporated herein by reference.

FIELD OF THE DISCLOSURE

The present application relates to the field of passive optical device technology and, more particularly, to an optical interface assembly and an optical module.

BACKGROUND

A connector, an optical fiber end surface, an optical interface, a detector surface, etc., in an optical fiber transmission system may all cause Fresnel reflection, producing reflected lights. A ratio of an optical power of these reflected lights to a power of an incident light is called a return loss. A worse return loss indicates stronger light reflection in an optical fiber link. Impacts of these backward reflected lights on the system include: 1) weakening an optical signal being transmitted; 2) producing a phenomenon of interference with an incident optical signal; and 3) lowering a signal-to-noise ratio in a digital transmission system. The backward reflected lights may also return to a transmitting light source and have impacts on the light source, including: 1) causing fluctuation of a center wavelength of the transmitting light source; 2) causing fluctuation of a luminous intensity of the transmitting light source; and 3) damaging the light source permanently. Even with an FP (fabry-perot) light source, whose spectral characteristics is not greatly impacted by backward reflection, the reflected lights are amplified by an active region after they enter into a resonant cavity of the light source, and the reflected lights join a main beam, causing fluctuation of the luminous intensity, which in turn causes a relative intensity noise (RIN). The RIN is a noise at a transmitting end rather than a receiving end; it will limit the maximum signal-to-noise ratio that can be possibly obtained in an optical fiber link and thereby impact reception sensitivity. In addition, the RIN by nature is a broadband noise that reflects the impact generated by the ups and downs of the luminous intensity of the light source and the system on the electrical noise of the receiving end relative to the power of the signal.

A symbol error rate of an optical system is higher when a speed of the system is higher, a noise bandwidth of a link is broader, a power of a noise is greater, and/or a signal-to-noise ratio is lower. Therefore, for a high-speed optical module, in order to ensure the reliability of its optical transmission system and the stability of the spectrum and the power of its transmitting light source, it is necessary to take high return loss into consideration when designing points where reflection easily occurs to minimize reflection in the link.

In an optical module in which a free-space circulator is integrated, these reflected lights at the module side have a chance to return to the receiving end. That is, a portion of a signal light at the transmitting end is directly diverted to the receiving end, which results in very obvious performance deterioration of the high-speed optical device. The portion of the signal light is equivalent to optical signal crosstalk from the transmitting end to the receiving end.

SUMMARY

Purposes of the present disclosure include providing an optical interface assembly and an optical module that may effectively improve return loss of the optical module and reduce optical crosstalk from the transmitting end to the receiving end in a high-speed optical module.

In order to achieve one or more aspects of the aforementioned purposes, one embodiment of the present disclosure provides an optical interface assembly, including a lens barrel, a lens disposed in the lens barrel, an optical receptacle, a stub disposed in the optical receptacle, and a diaphragm disposed between the lens and the stub. A diameter of a light passing hole of the diaphragm is smaller than a diameter of a light passing surface of the lens. A first end surface of the stub facing the lens is disposed at an inclined angle relative to an axis of the stub. When a light beam is coupled into the stub by the lens, a portion of a return light reflected from the first end surface of the stub is reflected to an outside of the light passing hole of the diaphragm.

DETAILED DESCRIPTION

Figure 1:
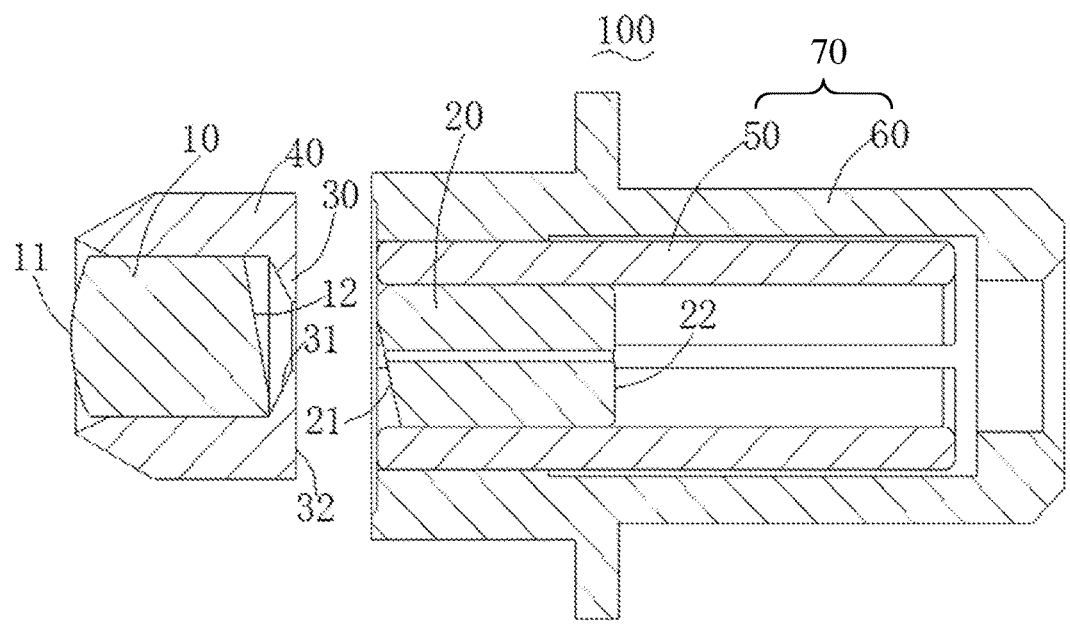
FIG. 1 is a section view of an optical interface assembly according to a first embodiment of the present disclosure.

The text below provides a detailed description of the present disclosure in conjunction with specific embodiments illustrated in the attached drawings. However, these embodiments do not limit the present disclosure. The scope of protection for the present disclosure covers changes made to the structure, method, or function by persons having ordinary skill in the art on the basis of these embodiments.

In order to facilitate the presentation of the drawings in the present disclosure, the sizes of certain structures or portions have been enlarged relative to other structures or portions. Therefore, the drawings in the present application are only for the purpose of illustrating the basic structure of the subject matter of the present application.

Additionally, terms in the text indicating relative spatial position, such as "upper," "above," "lower," "below," and so forth, are used for explanatory purposes in describing the relationship between a unit or feature depicted in a drawing with another unit or feature therein. Terms indicating relative spatial position may refer to positions other than those depicted in the drawings when a device is being used or operated. For example, if a device shown in a drawing is flipped over, a unit which is described as being positioned "below" or "under" another unit or feature will be located "above" the other unit or feature. Therefore, the illustrative term "below" may include positions both above and below. A device may be oriented in other ways (rotated 90 degrees or facing another direction), and descriptive terms that appear in the text and are related to space should be interpreted accordingly. When a component or layer is said to be "above" another member or layer or "connected to" another member or layer, it may be directly above the other member or layer or directly connected to the other member or layer, or there may be an intermediate component or layer.

First Embodiment 1

Figure 2:
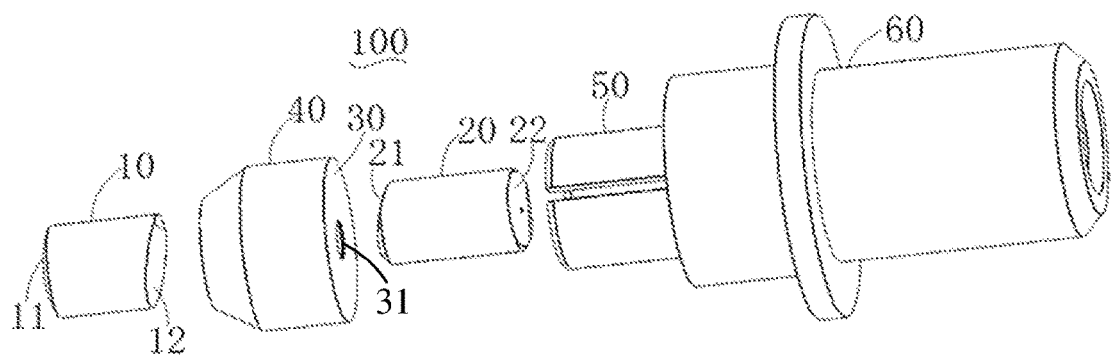
FIG. 2 is an exploded view of the optical interface assembly of FIG. 1.
Figure 3:
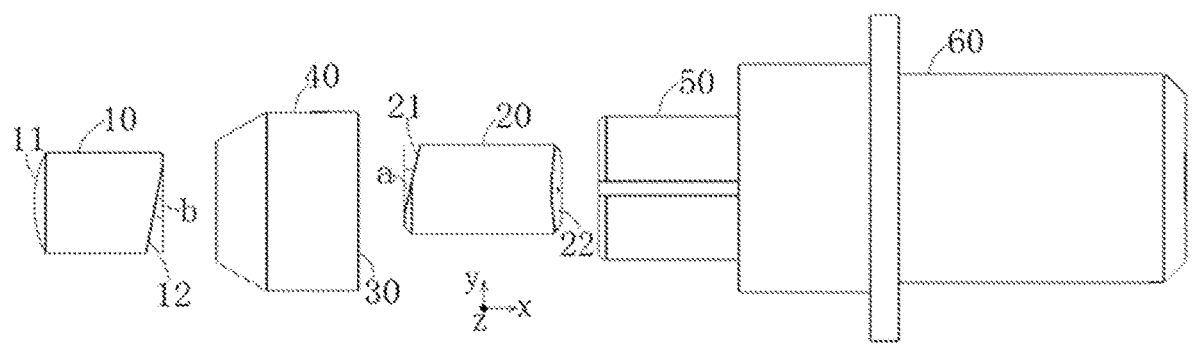
FIG. 3 is a side view of FIG. 2.
Figure 4:
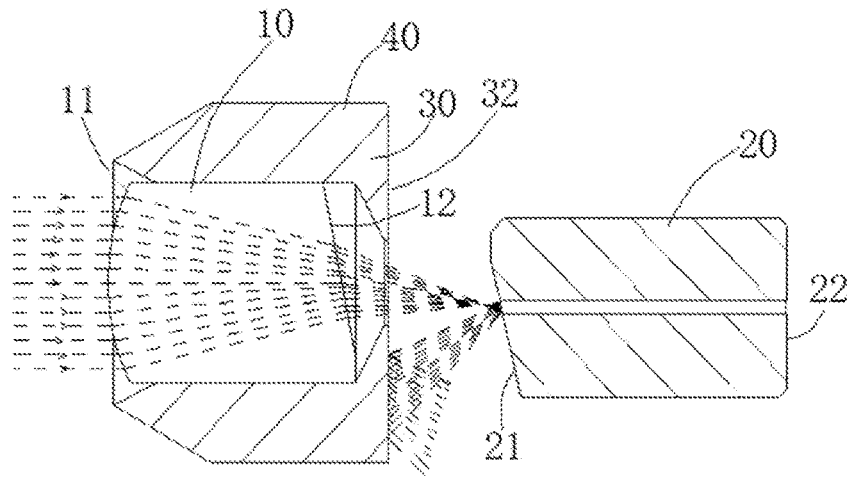
FIG. 4 is a diagram illustrating an effect of a diaphragm in the optical interface assembly according to the first example embodiment.

FIG. 1 is a sectional view of an optical interface assembly 100 according to a first embodiment of the present disclosure. FIG. 2 is an exploded view of the optical interface assembly 100 of FIG. 1. FIG. 3 is a side view of the optical interface assembly 100 in FIG. 2. FIG. 4 is a diagram illustrating an effect of a diaphragm in the optical interface assembly 100 according to the first embodiment. As illustrated in FIG. 1 through FIG. 4, an optical interface assembly 100 according to the first embodiment comprises a lens 10 and a stub 20. The lens 10 is disposed inside a lens barrel 40. The stub 20 together with a sleeve 50 and an outer tube 60 form an optical receptacle 70. The outer tube 60 has a metal tube body. The sleeve 50 is disposed inside the outer tube 60, and the stub 20 is then disposed inside the sleeve 50. A diaphragm 30 is further disposed between the lens 10 and the stub 20. A diameter of a light passing hole 31 of the diaphragm 30 is smaller than a diameter of a light passing surface of the lens 10. As illustrated in FIG. 1, the light passing hole 31 has a tapered shape or trumpet-like shape having a larger opening and a smaller opening. The aforementioned diameter of the light passing hole 31 refers to a diameter of the smaller opening of the light passing hole 31. The aforementioned diameter of the light passing surface of the lens 10 refers to a diameter of a cross sectional of the lens 10 that is perpendicular to an optical axis of the lens 10. In the first embodiment, the diaphragm 30 and the lens barrel 40 are designed to be a single structure. In other embodiments, the diaphragm 30 and the lens barrel 40 may alternatively be separate structures. As illustrated in FIG. 3 and FIG. 4, a first end surface 21 of the stub 20 facing the lens 10 is disposed at an inclined angle relative to the axis of the stub 20 (the axis being a straight line on which an optical axis of the stub 20 is located). A light beam is coupled into the stub 20 by the lens 10. A portion of a return light reflected from the aforementioned first end surface 21 is reflected to the outside of the light passing hole of the diaphragm 30 and is blocked by the diaphragm 30 to prevent return light from entering into an optical device of an optical module in which the optical interface assembly 100 is disposed. With the diameter of the light passing hole of the diaphragm 30, parameters of the lens 10, and other factors taken into consideration, an angle a between the aforementioned first end surface 21 of the stub 20 and a cross section of the stub 20 (the cross section being perpendicular to an optical axis of the stub 20) may be selected in the range of 0° to 15°. For example, the angle a may be between 10° and 14°, such as 12°, 13°, etc. In the first embodiment, a second end surface 22 of the stub 20 farther away from the lens 10 is disposed at an inclined angle relative to the axis of the stub 20 and has a standard angled physical contact (APC) end surface. As illustrated in FIG. 3, the direction of the inclination of the second end surface 22 is different from the direction of inclination of the first end surface 21. More particularly, the first end surface 21 is inclined in the x direction while the second end surface 22 is inclined in the z direction. In other words, the direction of the inclination of the first end surface 21 is 90° relative to the direction of the inclination of the second end surface 22. In other embodiments, the directions of the inclinations of the first end surface 21 and the second end surface 22 do not have to be 90° from each other. The directions of the inclinations of the first end surface 21 and the second end surface 22 may be at another angle from each other as long as the first end surface 21 and the second end surface 22 are not parallel.

The light passing hole of the diaphragm 30 added to the optical interface assembly 100 has a relatively small diameter, so the diaphragm 30 may block stray lights, such as light reflected from an end surface, from returning to the inside of the optical device of the optical module in which the optical interface assembly 100 is disposed, thus effectively improving the return loss of the optical interface assembly 100. When used in an optical module, the optical interface assembly 100 may reduce optical crosstalk from a transmitting end to a receiving end in the optical module, thereby ensuring the reliability of the optical module 100's optical transmission system and the stability of the spectrum and power of the optical module 100's transmitting light source.

As described previously, in the first embodiment illustrated in FIG. 1, the light passing hole 31 of the diaphragm 30 has the tapered shape or trumpet-like shape having the larger opening and the smaller opening. The larger opening of the tapered shape or trumpet-like shape faces the lens 10. The tapered shape or trumpet-like shape may minimize the diameter of the light passing hole 31 of the diaphragm 30 without affecting the passage of the coupled light beam. The inner surface of the light passing hole 31 having a tapered shape or trumpet-like shape is a surface that has undergone blackening treatment. An end surface 32 of the diaphragm 30 facing the stub 20 is also a surface that has undergone blackening treatment. The inner surface and the end surface 32 of the diaphragm 30 may absorb stray lights that are reflected or reduce the amount of stray lights that are reflected back into the optical device of the optical module in which the optical interface assembly is disposed, thus further improving the return loss of the optical interface assembly 100. The blackening treatment may be a roughening treatment or coating a surface with a light-absorbing coating, etc.

As illustrated in FIG. 3, the aforementioned lens 10 is a plano-convex lens comprising a convex surface 11 farther away from the stub 20 and a flat surface 12 closer to the stub 20. Here, the flat surface 12 is disposed at an inclined angle relative to a cross section of the lens 10 (the cross section being perpendicular to an optical axis of the lens 10). An angle b between the flat surface 12 and the cross section of the lens 10 is in the range of 0° to 15°. For example, the angle b is between 10° and 12°, such as 11°, 12°, etc. By configuring both the first end surface 21 of the stub 20 and the flat surface 12 of the lens 10 facing the first end surface 21 to be inclined surfaces at larger angles, reflected light may be reduced effectively.

Second Embodiment

Figure 5:
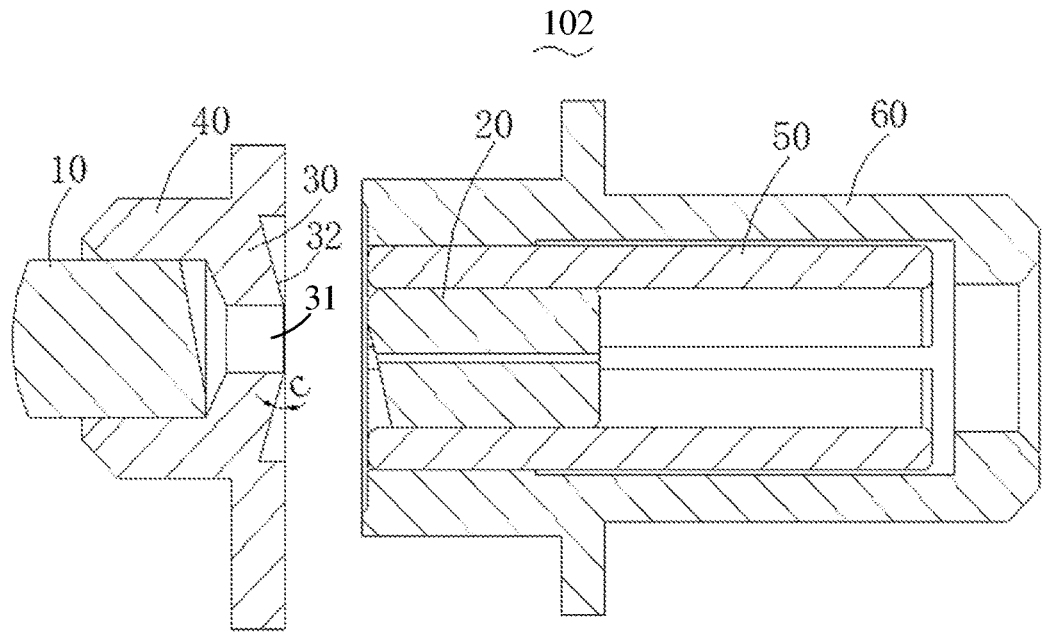
FIG. 5 is a diagram illustrating an optical interface assembly according to a second embodiment of the present disclosure.
Figure 6:
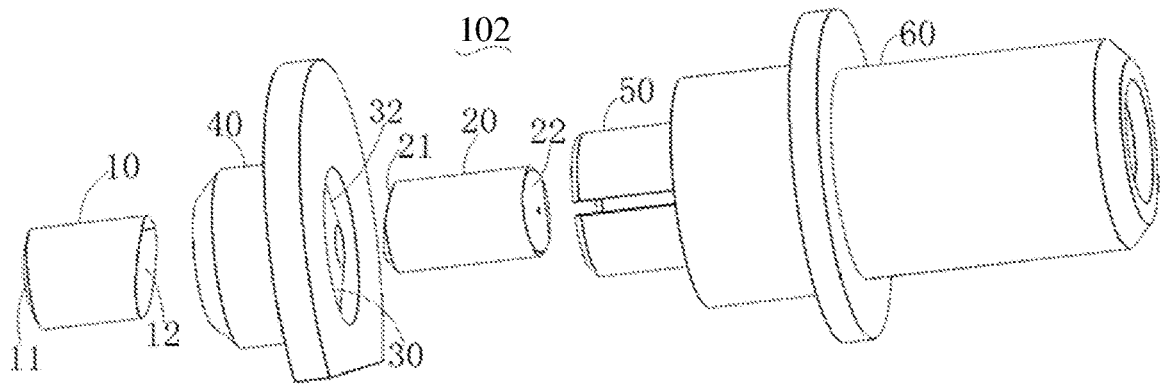
FIG. 6 is an exploded view of the optical interface assembly of FIG. 5.

FIG. 5 is a diagram illustrating an optical interface assembly 102 according to a second embodiment of the present disclosure. FIG. 6 is an exploded view of the optical interface assembly 102 of FIG. 5. As illustrated in FIG. 5 and FIG. 6, the second embodiment differs from the first embodiment in that the end surface 32 of the diaphragm 30 facing the stub 20 does not need to undergo blackening treatment. Rather, the end surface 32 is configured to be a tapered surface or a convex spherical surface 32. The tapered surface or convex spherical surface 32 is centered and surrounds the light passing hole 31 of the diaphragm 30, and is inclined toward the lens barrel 40. An angle c between the tangent of the tapered surface or convex spherical surface 32 and a cross section of the diaphragm 30 (the cross section being perpendicular to an optical axis of the light passing hole 31) is greater than or equal to 5° and less than 90°. The greater the angle c is, the better. For example, the angle c may be greater than or equal to 10° and less than 90°. A portion of a return light reflected from the first end surface 21 of the stub 20 is reflected to the tapered surface or convex spherical surface 32 of the diaphragm 30. As the angle c of inclination between the tapered surface or convex spherical surface 32 and the cross section of the diaphragm 30 is relatively large, the reflected light may be reflected out of the optical interface assembly 102, thereby preventing the reflected light from entering into an optical device of an optical module in which the optical interface assembly 102 is disposed. With a diaphragm having the structure described above, there is no need to apply blackening treatment to the aforementioned end surface 32 of the diaphragm, thus simplifying the processing of the diaphragm 30 and lowering the cost.

Third Embodiment

Figure 7:
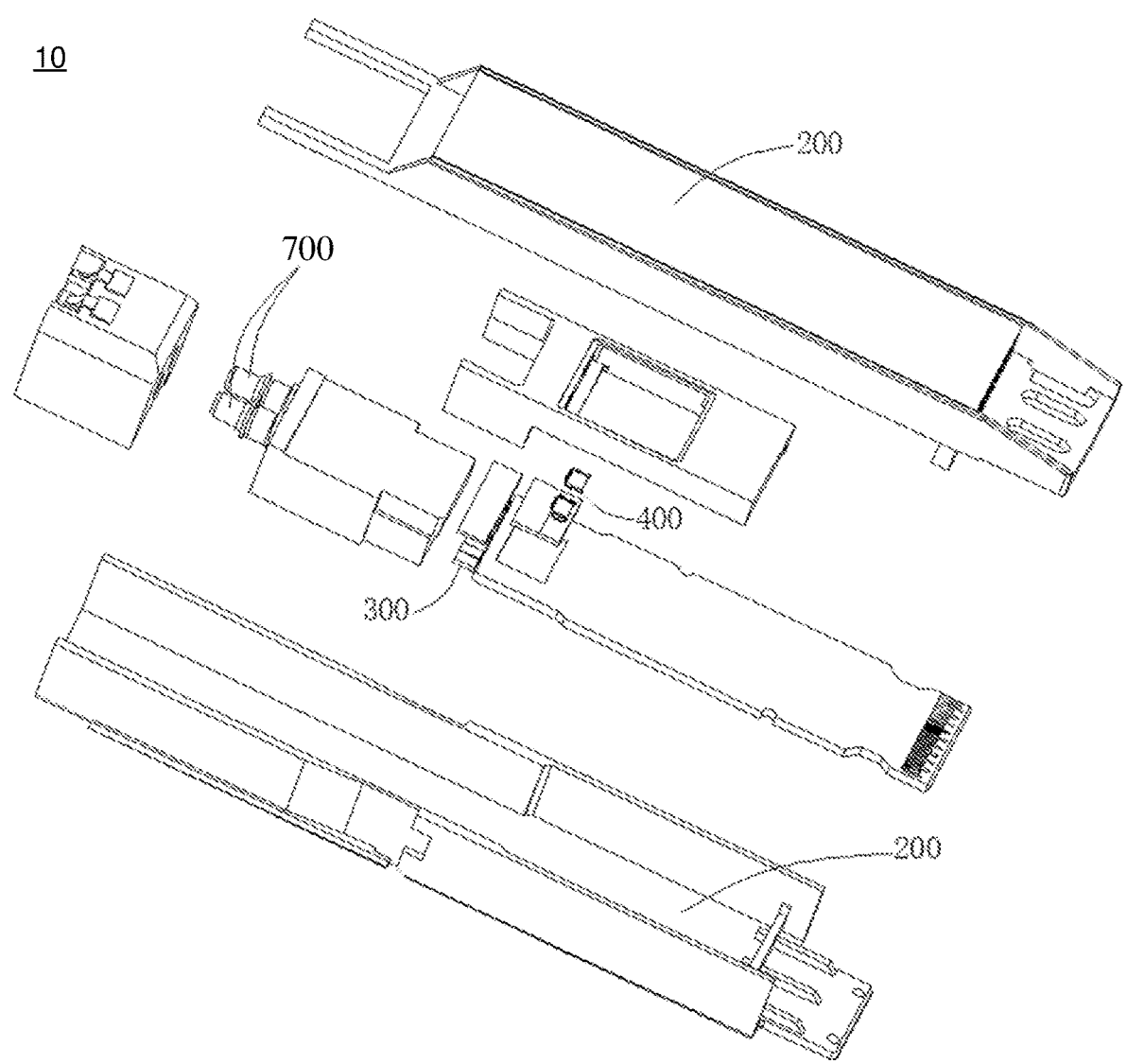
FIG. 7 is a diagram illustrating an optical module according to a third embodiment of the present disclosure.

FIG. 7 is a diagram illustrating an optical module 10 according to a third embodiment of the present disclosure. As illustrated in FIG. 7, the optical module 10 according to the third embodiment comprises a housing 200, a light transmitting end 300 and a light receiving end 400 disposed in the housing 200, and an optical interface assembly 700 coupled to the aforementioned light transmitting end 300 and light receiving end 400. The optical interface assembly 700 may be the optical interface assembly 100 or 102 according to any one of the aforementioned embodiments.

The embodiments of the present disclosure provides the following benefits. The diaphragm 30 in the optical interface assembly 100 or 102 blocks stray lights from returning to the inside of the optical module 10, thus effectively improving the return loss of the optical interface assembly 100 or 102, reducing optical crosstalk from the transmitting end 300 to the receiving end 400 in the high-speed optical module 10, and ensuring the reliability of the module 10's optical transmission system and the stability of the spectrum and power of the module 10's transmitting light source.

The series of detailed descriptions above is only intended to provide specific descriptions of feasible embodiments of the present disclosure. They are not to be construed as limiting the scope of protection for the present disclosure; all equivalent embodiments or changes that are not detached from the technology of the present disclosure in essence should fall under the scope of protection of the present disclosure.

What is claimed is:

1. An optical interface assembly, comprising a lens, an optical receptacle, and a stub disposed in the optical receptacle,
   wherein
   the lens comprises a convex surface farther away from the stub and a flat surface near the stub, the flat surface and a cross section of the lens being disposed at an inclined angle from each other,
   a first end surface of the stub facing the lens is disposed at an inclined angle relative to an axis of the stub,
   the flat surface of the lens and the first end surface of the stub are substantially parallel to each other,
   an optical axis of the lens is parallel with an optical axis of the stub, and the optical axis of the lens does not coincide with the optical axis of the stub, and
   the flat surface of the lens, the optical axis of the lens, the first end surface of the stub, the optical axis of the stub, and a distance between the flat surface of the lens and the first end surface of the stub, are configured such that, when a light beam is coupled into the stub by the lens, a portion of a return light reflected from the first end surface of the stub is transmitted to an outside of the lens.

2. The optical interface assembly of claim 1, wherein the inclined angle between the flat surface and the cross section of the lens is between 0° and 15°.

3. The optical interface assembly of claim 1, wherein an angle between the first end surface of the stub and a cross section of the stub is between 0° and 15°.

4. The optical interface assembly of claim 1, further comprising a diaphragm disposed between the lens and the stub, the diaphragm including a light passing hole,
   wherein a diameter of the light passing hole is smaller than a diameter of a light passing surface of the lens.

5. The optical interface assembly of claim 4, wherein the diameter of the light passing hole is smaller than a diameter of a light passing surface of the stub.

6. The optical interface assembly of claim 5, wherein an end surface of the diaphragm facing the stub is a surface that has undergone blackening treatment.

7. The optical interface assembly of claim 1, wherein a second end surface of the stub farther away from the lens is disposed at an inclined angle relative to the axis of the stub, a direction of inclination of the second end surface being different from a direction of inclination of the first end surface.

8. The optical interface assembly of claim 7, wherein the direction of the inclination of the first end surface of the stub is 90° relative to the direction of the inclination of the second end surface of the stub.

9. An optical module, comprising a housing, and a light transmitting end, and a light receiving end disposed in the housing, wherein the optical module further comprises the optical interface assembly of claim 1.

* * * * *